US012672009B2

(12) United States Patent　　　　(10) Patent No.:　US 12,672,009 B2

Hajar et al.　　　　　　　　　　　　(45) Date of Patent:　Jun. 30, 2026

(54) WIRELESS PLANNING FOR REDUCED POWER CONSUMPTION

(71) Applicant: Cisco Technology, Inc., San Jose, CA (US)

(72) Inventors: Taha Hajar, Chavannes-pres-Renens (CH); Samer M. Salam, Beirut (LB); Amine Choukir, Lausanne (CH); Salvatore Valenza, Pomy (CH)

(73) Assignee: Cisco Technology, Inc., San Jose, CA (US)

( * ) Notice: Subject to any disclaimer, the term of this patent is extended or adjusted under 35 U.S.C. 154(b) by 520 days.

(21) Appl. No.: 18/193,871

(22) Filed: Mar. 31, 2023

(65) Prior Publication Data

US 2024/0334197 A1　　Oct. 3, 2024

(51) Int. Cl.
　　*H04W 16/20*　　　(2009.01)
　　*H04W 52/02*　　　(2009.01)

(52) U.S. Cl.
　　CPC ....... *H04W 16/20* (2013.01); *H04W 52/0203* (2013.01)

(58) Field of Classification Search
　　CPC ............. H04W 16/20; H04W 52/0203; H04W 52/0206; Y02D 30/70
　　See application file for complete search history.

(56) References Cited

U.S. PATENT DOCUMENTS

2004/0260813 A1　12/2004　Heisserman et al.
2007/0025287 A1 *　2/2007　Goren ................... H04W 16/18
　　　　　　　　　　　　　　　　　370/328
2008/0075051 A1　3/2008　Dundar et al.
2011/0263277 A1 *　10/2011　Zuniga Gallegos ........................
　　　　　　　　　　　　　　　　　H04B 17/3913
　　　　　　　　　　　　　　　　　455/67.11
2014/0141788 A1 *　5/2014　Puthenpura ........... H04W 16/18
　　　　　　　　　　　　　　　　　455/449
2015/0142391 A1　5/2015　Flynn et al.
2015/0304983 A1 *　10/2015　Krening .............. H04W 64/003
　　　　　　　　　　　　　　　　　370/254
2019/0132217 A1　5/2019　Kalika et al.
2021/0263128 A1　8/2021　Smith et al.
2023/0129078 A1 *　4/2023　Wainer .................. G06F 16/904
　　　　　　　　　　　　　　　　　455/446

OTHER PUBLICATIONS

Penttinen, Jyrki T.J. "Planning of the LTE-Advanced Radio Network", Giesecke & Devrient, USA, The LTE-Advanced Deployment Handbook; Wiley Online Library, Dec. 5, 2015 (36 pages).

* cited by examiner

*Primary Examiner* — Rasheed Gidado

(74) *Attorney, Agent, or Firm* — Merchant & Gould P.C.

(57)　　　　　　　ABSTRACT

Wireless planning for reduced power consumption may be provided. Characteristics of a space may be received, wherein the characteristics include a representation of the space. A model of the space may be generated using the representation of the space. Next, a coverage requirement and a power saving requirement may be determined for the space. An initial wireless plan may be generated including one or more APs positioned in the model of the space. The initial wireless plan may be adjusted based on the coverage requirement and the power saving requirement to generate a final wireless plan.

19 Claims, 9 Drawing Sheets

400

405

Start

410

Receive characteristics of a space

420

Generate a model of the space using the representation of the space

430

Determine a coverage requirement and a power saving requirement for the space

440

Generate an initial wireless plan including one or more APs positioned in the model of the space

450

Adjusting the initial wireless plan

460

End

WIRELESS PLANNING FOR REDUCED POWER CONSUMPTION

TECHNICAL FIELD

The present disclosure relates generally to providing wireless planning for reduced power consumption.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
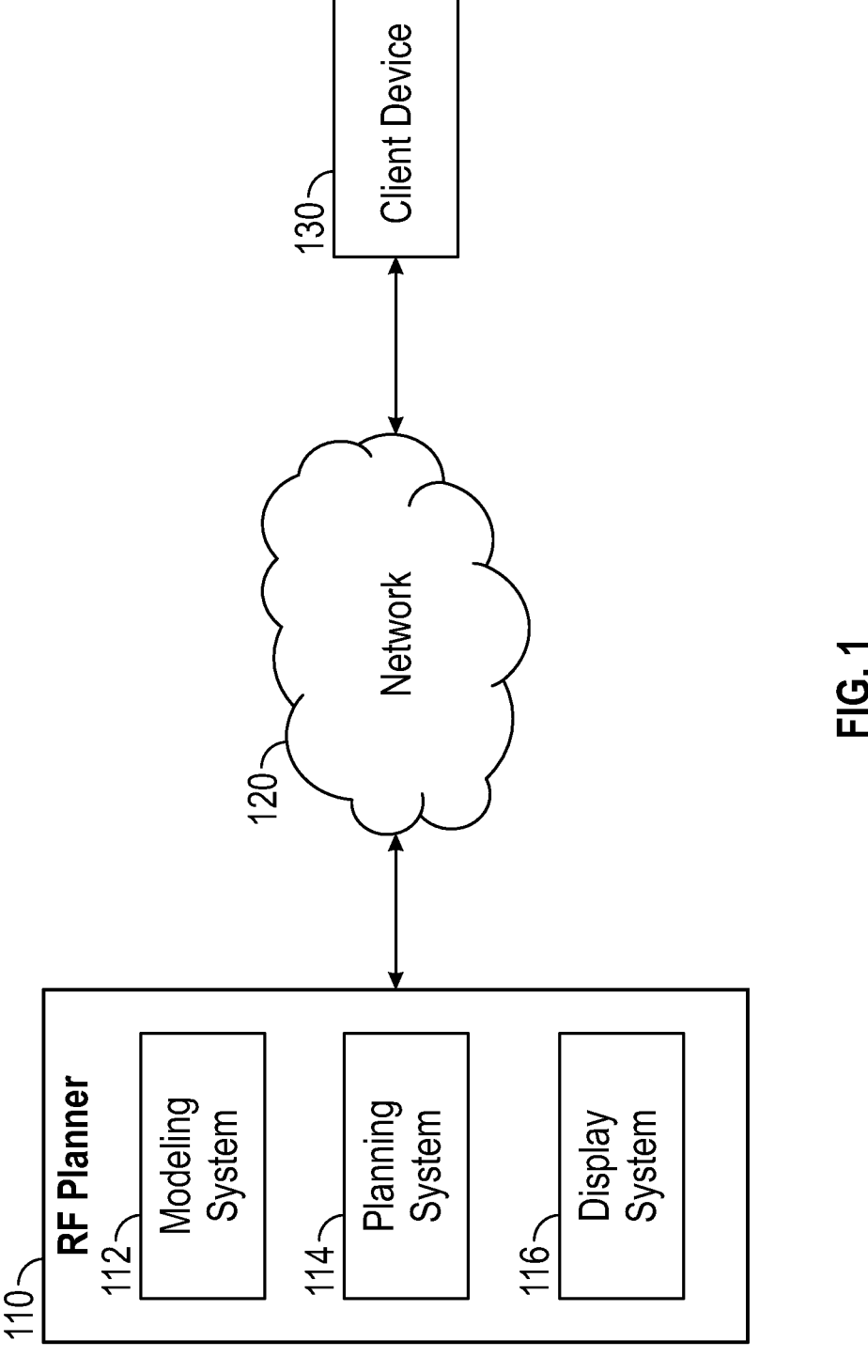
FIG. 1 is a block diagram of an operating environment for wireless planning for reduced power consumption.

Wireless planning for reduced power consumption may be provided. Characteristics of a space may be received, wherein the characteristics include a representation of the space. A model of the space may be generated using the representation of the space. Next, a coverage requirement and a power saving requirement may be determined for the space. An initial wireless plan may be generated including one or more APs positioned in the model of the space. The initial wireless plan may be adjusted based on the coverage requirement and the power saving requirement to generate a final wireless plan.

Both the foregoing overview and the following example embodiments are examples and explanatory only and should not be considered to restrict the disclosure's scope, as described, and claimed. Furthermore, features and/or variations may be provided in addition to those described. For example, embodiments of the disclosure may be directed to various feature combinations and sub-combinations described in the example embodiments.

EXAMPLE EMBODIMENTS

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Enterprise wireless networks may consume significant amount of power throughout the year, and excess power consumption can lead to higher operation costs, environmental concerns, and the like. However, designing wireless networks can be complex. Designing a power network while considering power consumption may therefore be difficult to achieve or can lead to even more complexity.

There are several Radio Frequency (RF) planning tools available that include control knobs for wireless coverage metrics as well as for cost. However, there are no tools available that take into account a network's power footprint in the planning stage to enable wireless planning for reduced power consumption.

FIG. 1 is a block diagram of an operating environment 100 for wireless planning for reduced power consumption. The operating environment 100 may include a Radio Frequency (RF) planner 110, a network 120, and a client device 130. The RF planner 110 may include a modeling system 112, a planning system 114, and a display system 116.

The RF planner 110 may create one or more wireless plans for a new wireless network and/or adjusting an existing wireless network. The RF planner 110 may receive characteristics for a wireless plan to be generated. For example, the client device 130 may send the RF planner 110 the characteristics for a new wireless plan via the network 120. The characteristics may include a representation of the space for wireless planning (e.g., a floor plan), types of Access Points (APs) to use in the wireless plan, a amounts of APs to use (e.g., a minimum amount of APs, a maximum amount of APs), an amount of estimated clients, an amount of estimated traffic, and/or the like. The characteristics may also include information associated with position in the space (e.g., where clients will be positioned, such as twenty clients on a first floor and ten clients of a second floor of the space).

The modeling system 112 may generate a model of the space using the representation of a space for use in planning. For example, the RF planner 110 may receive a representation of a space, including obstructions that may interfere with signals sent and received by an AP, such as walls, floors, windows, furniture, electronics, trees, hills, rocks, and the like. The modeling system 112 may generate the model a space by identifying rooms and/or other subspaces of a space, identifying the level of interference an obstacle may cause, identifying estimated client demand and/or estimated traffic at different positions of the space, and/or the like. The representation of the space may include material types of obstacles and/or other features of the space, and the modeling system 112 may identify the level of interference an obstacle may cause based on the material types. The modeling system 112 may generate the model of the space in a format for the planning system 114 to use when generating wireless plans, so the planning system 114 may determine how obstacles and/or other features of the space will affect AP signals.

When the characteristics include the type and/or operating conditions of APs, the planning system 114 may use the characteristics detailing the type and/or operating conditions of APs to determine which APs to use in a wireless plan. Alternatively, the planning system 114 may determine the type and/or operating conditions of APs based on other characteristics, such based on the model of the space, the type of AP needed based on the amount of APs specified, and/or the like. The planning system 114 may determine multiple types of APs to be used for wireless planning of a space.

The planning system 114 may use the determined APs when generating one or more wireless plans in the space defined by the model of the representation of the space. When generating wireless plans, the planning system 114 may consider the coverage (e.g., whether the coverage meets the requirements of a Service Level Agreement (SLA)) and the power consumption of the wireless plan's configuration. For example, the provider of the network to be installed in the space may have an agreement with the customer associated with the space to provide a certain level of coverage (e.g., network capacity, signal strength, network speed, area where the network will function, etc.), and an SLA may define the required or otherwise acceptable level of coverage for a wireless plan. The planning system 114 may attempt to minimize or otherwise reduce the power consumption of a wireless plan while meeting the coverage requirement of the wireless plan.

The planning system 114 may model wireless plans in the space defined by a received representation of the space by adjusting wireless plan variables. The wireless plan variables may include positions of APs, amounts of APs, operational radios of APs, operating modes of the APs, power policies of APs, frequency or band of operation of the radios, amounts of clients, amounts of traffic, and/or the like. Adjusting a wireless plan variable may change the coverage and/or the power consumption of the respective wireless plan.

The wireless plan variables may change over time. For example, the amount of clients and/or traffic may be higher during the day than at night in an office space. Thus, the planning system 114 may consider the coverage and power consumption for different times to account for variable wireless plan variables that change over time. The planning system 114 may determine wireless plans to allow a portion of the APs in the wireless plan to be turned off or switched to a lower power mode during periods with lower demand.

When the planning system 114 first begins generating wireless plans for a space, the planning system 114 may make an initial placement of one or more APs and evaluate the coverage and power levels of the placement. The initial placement may be a random placement by the planning system 114 or an estimated placement based on the characteristics of the representation of the space. The planning system 114 may make adjustments to improve the coverage and power levels of the placements, such as adjusting the one or more APs, adding additional APs, removing APs, changing AP type, changing AP operation, and/or the like. The planning system 114 may assign wireless plans a coverage score that indicates the level of coverage of the wireless plan and a power saving that indicates the power savings of the wireless plan. The planning system 114 may use the coverage score and/or the power saving score to determine if a wireless plan should be implemented for the installation of APs at the space.

The planning system 114 may make incremental adjustments to the initial placement and evaluate the coverage and power levels of the new placements. The planning system 114 may conclude the adjustments when the wireless plan meets the coverage and power level requirements. The planning system 114 may continue making changes to determine if further improvements can be made to the coverage and/or power levels, resulting in multiple wireless plans. For example, the planning system 114 may generate a wireless plan that maximizes the coverage while maintaining the required power level, a wireless plan that balances the coverage and power levels, a wireless plan that maximizes the reduction in power level while maintaining the required coverage, and/or the like. Thus, the planning system 114 may generate a final wireless plan that emphasizes the coverage score, a final wireless plan that balances the coverage score and the power saving score, a final wireless plan that emphasizes the power saving score, and/or the like.

In other examples, the planning system 114 may generate multiple wireless plans with initial placements of APs and evaluate the multiple wireless plans using the associated coverage scores and/or power saving scores. The planning system 114 may determine one of the wireless plans meets coverage and power savings requirements. The planning system 114 may also determine the wireless plan with the best combination of coverage scores and power savings scores and begin making incremental changes to the identified wireless plan to generate the final wireless plan(s).

When the planning system 114 determines the one or more wireless plans that meet coverage and power requirements for a space, the RF planner 110 may provide the one or more wireless plans for review, adjustment, approval, and/or implementation. For example, RF planner 110 may provide the wireless plans to the client device 130. The display system 116 may display Graphical User Interfaces (GUIs) for the client device 130 and/or other devices to access. The display system 116 may generate GUIs for receiving information for generating wireless plans and displaying generated wireless plans. The GUIs may be displayed directly on the client device 130, on another device, and/or on a display of the RF planner 110. The display system 116 may allow the client device 130 to access GUIs may allow the client device 130 to request a new wireless plan and/or a modification of an existing wireless plan, input characteristics for the requested wireless plan, review generated wireless plan options, and/or the like.

The client device 130 may be used to select a wireless plan for implementation based on preferences. For example, a client, using the client device 130, may select a wireless plan that maximizes coverage, a wireless plan that maximizes power savings, a wireless plan that balances coverage and power savings, or the like. The selected wireless plan may then be used to install in the space the APs in the position, operating mode, and/or the like defined by the selected wireless plan.

Figure 2A:
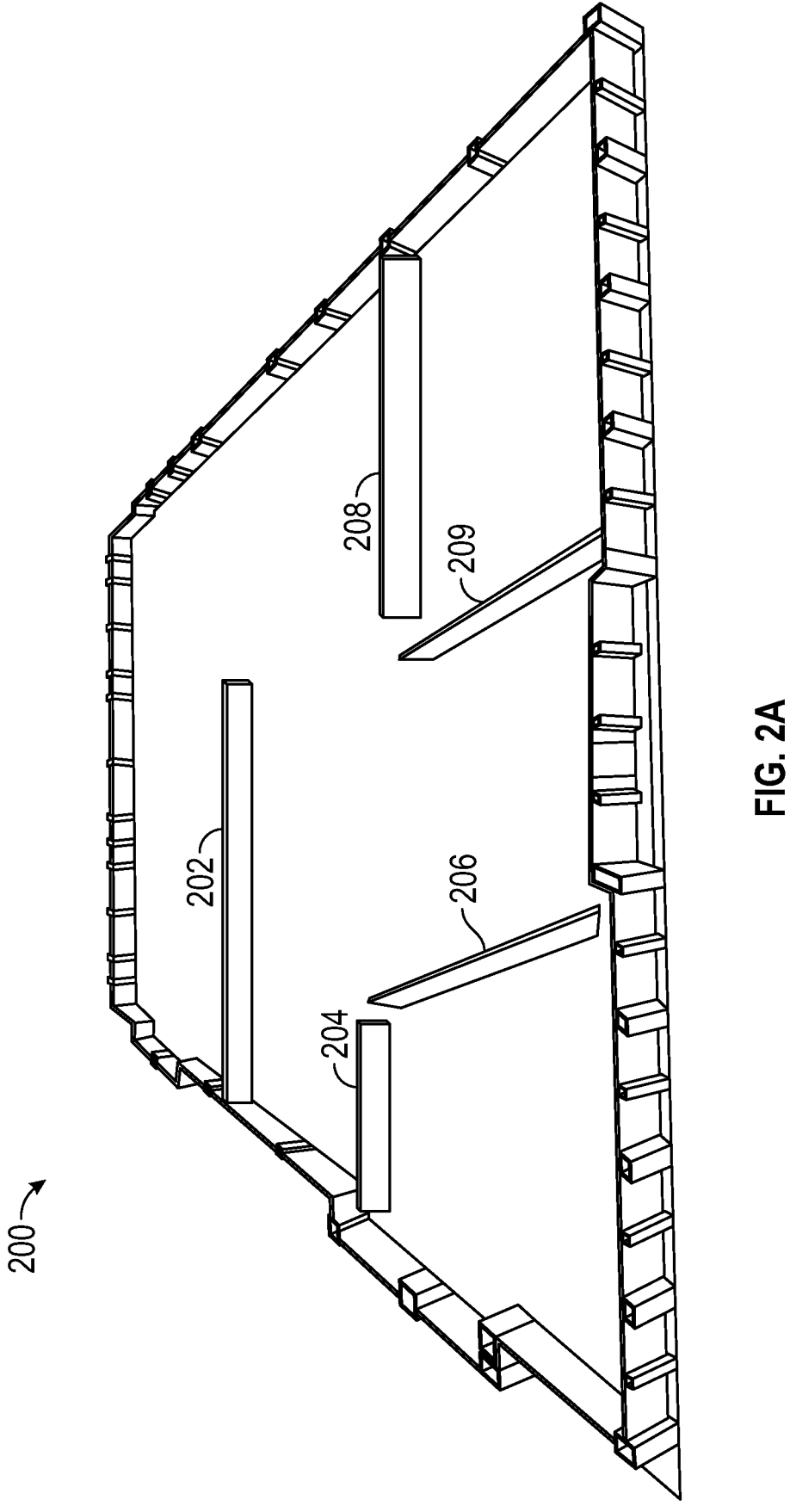
FIG. 2A is a diagram of a representation of a space for wireless planning for reduced power consumption.

FIG. 2A is a diagram of a representation of a space 200 for wireless planning for reduced power consumption. The representation of the space 200 may include a first obstruction 202, a second obstruction 204, a third obstruction 206, a fourth obstruction 208, and a fifth obstruction 209. The first obstruction 202, the second obstruction 204, the third obstruction 206, the fourth obstruction 208, and the fifth obstruction 209 may be any obstruction that may interfere with signals sent and received by an AP, such as walls, floors, windows, furniture, electronics, trees, hills, rocks, and the like. In the example illustrated by FIG. 2A, the representation of the space 200 is a single floor of a building. Representations of spaces may be multiple floors of a building, outdoor areas, mixed indoor and outdoor areas, and/or the like in other examples.

The modeling system 112 may model the representation of the space 200 based on the positions of the first obstruction 202, the second obstruction 204, the third obstruction 206, the fourth obstruction 208, and the fifth obstruction 209. The modeling system 112 may also model the interference capabilities of the obstructions. For example, a thick concrete wall may interfere with the signals of an AP more than a thin sheetrock wall. The planning system 114 may use the model of the representation of the space 200 to generate wireless plans.

Figure 2B:
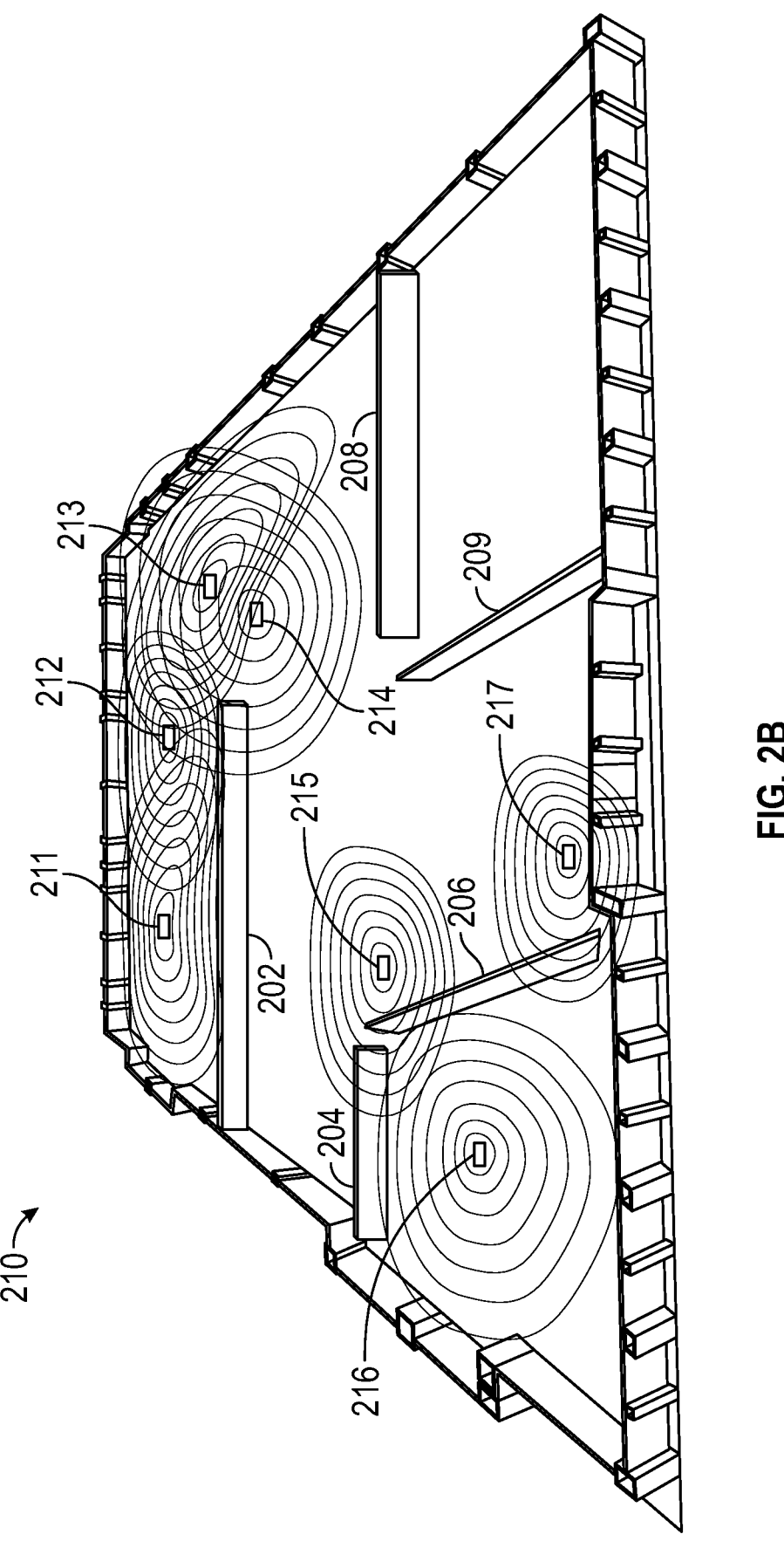
FIG. 2B is a diagram of a first wireless plan with low coverage and a low power saving score.

FIG. 2B is a diagram of a first wireless plan 210 with low coverage and a low power saving score. The first wireless plan 210 includes a first AP 211, a second AP 212, a third AP 213, a fourth AP 214, a fifth AP 215, a sixth AP 216, and a seventh AP 217. The planning system 114 may place the first AP 211, the second AP 212, the third AP 213, the fourth AP 214, the fifth AP 215, the sixth AP 216, and the seventh AP 217 in the initial positions.

The planning system 114 may determine that the current placement of APs in the first wireless plan 210 does not meet the coverage level because the space represented is not fully covered for a network. For example, a user in a subspace defined by the fourth obstruction 208 and the fifth obstruction 209 may not access the network. The planning system 114 may also determine the first wireless plan 210 does not meet power requirements because seven APs are being used for only partial coverage of the space. For example, the planning system 114 may determine the operation of the second AP 212 is wasted power because the second AP 212 does not provide any coverage that the first AP 211, the third AP 213, and the fourth AP 214 provide. Similarly, the third AP 213 and the fourth AP 214 may have a coverage that mainly overlaps, so the third AP 213 operating with the fourth AP 214 may result in wasted power consumption. In some examples, the APs may need to overlap in coverage to handle client and/or traffic demand, and the planning system 114 may consider this when determining whether the power requirement is met or if power usage is reduced. Therefore, the planning system 114 may assign the first wireless plan 210 a low coverage score and a low power saving score.

Figure 2C:
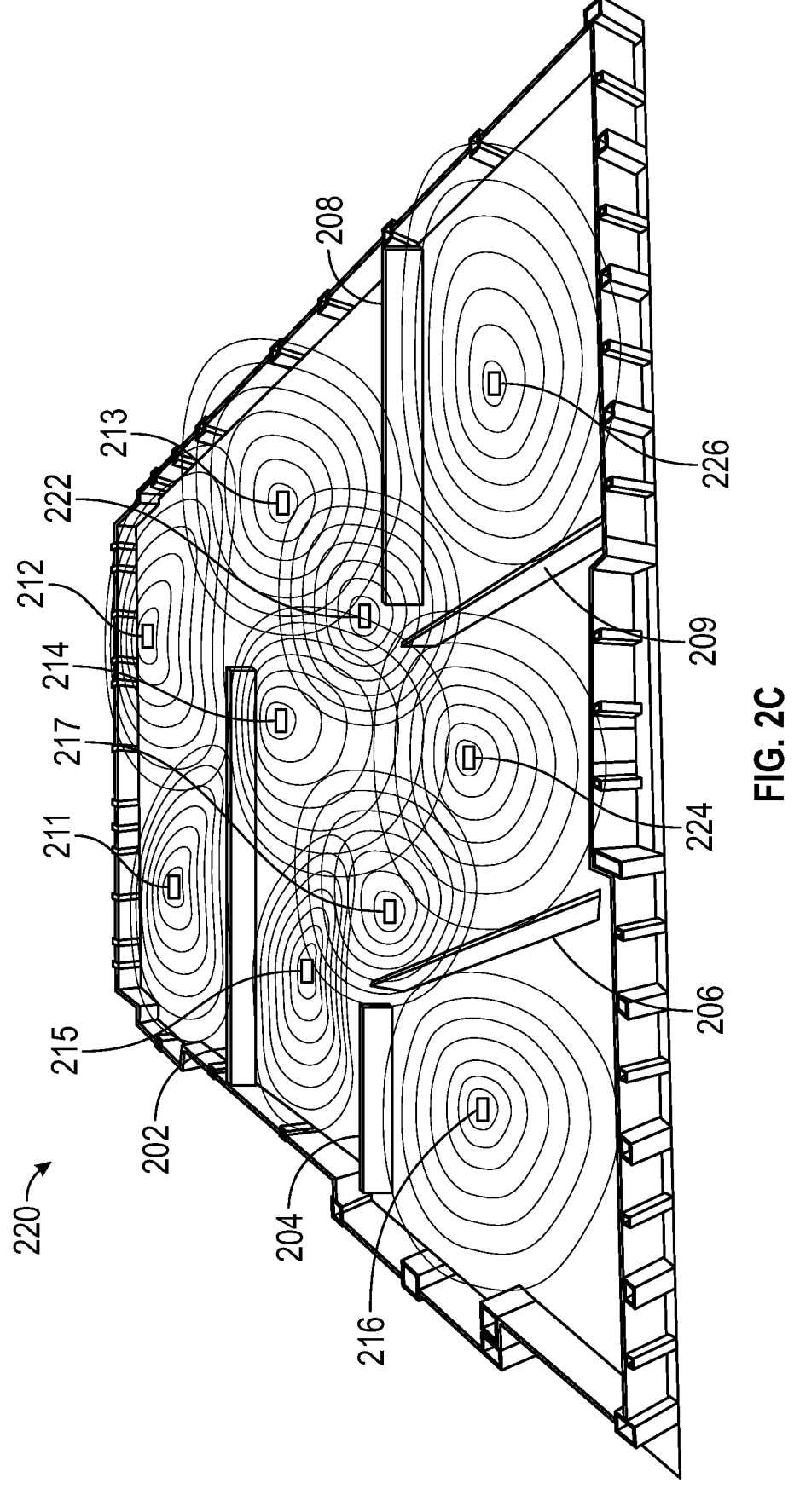
FIG. 2C is a diagram of a second wireless plan with high coverage and a low power saving score.

FIG. 2C is a diagram of a second wireless plan 220 with high coverage and a low power saving score. The second wireless plan 220 includes the first AP 211, the second AP 212, the third AP 213, the fourth AP 214, the fifth AP 215, the sixth AP 216, and the seventh AP 217, an eighth AP 222, and a ninth AP 224. The planning system 114 may generate the second wireless plan 220 using the first wireless plan 210 or make the placements of APs as initial placements. For example, the planning system 114 may determine the first wireless plan 210 does not meet the coverage and power requirements, and make adjustments in the second wireless plan 220. The adjustments may include moving the second AP 212, the third AP 213, the fourth AP 214, the fifth AP 215, and the seventh AP 217 (e.g., based on the coverage the APs can provide, the overlap of coverages, etc.) and adding the eighth AP 222, the ninth AP 224, and the tenth AP 226. The planning system 114 may also adjust the operation, type, etc. of the APs included in the second wireless plan 220 compared to the APs of the first wireless plan 210.

Because the second wireless plan 220 may cover the entire space, the planning system 114 may determine that the second wireless plan 220 has a high coverage score. The second wireless plan's 220 coverage score may be high enough to meet coverage requirements. However, the planning system 114 may determine the second wireless plan 220 has a low power saving score because the second wireless plan 220 is using ten APs for a space that may require fewer APs for the same coverage level. For example, the seventh AP 217 and the eighth AP 222 may not provide unique coverage compared to the coverage of other APs, so the operation of the seventh AP 217 and the eighth AP 222 may be unnecessary. Additionally, a single AP that provides the same amount of coverage as multiple APs may use more power than one of the APs in the second wireless plan 220 but less power than combination of APs providing the same amount of coverage the single AP can. Thus, the planning system 114 may remove APs and/or replace APs of the second wireless plan 220 with other types of APs to increase the power saving score.

Figure 2D:
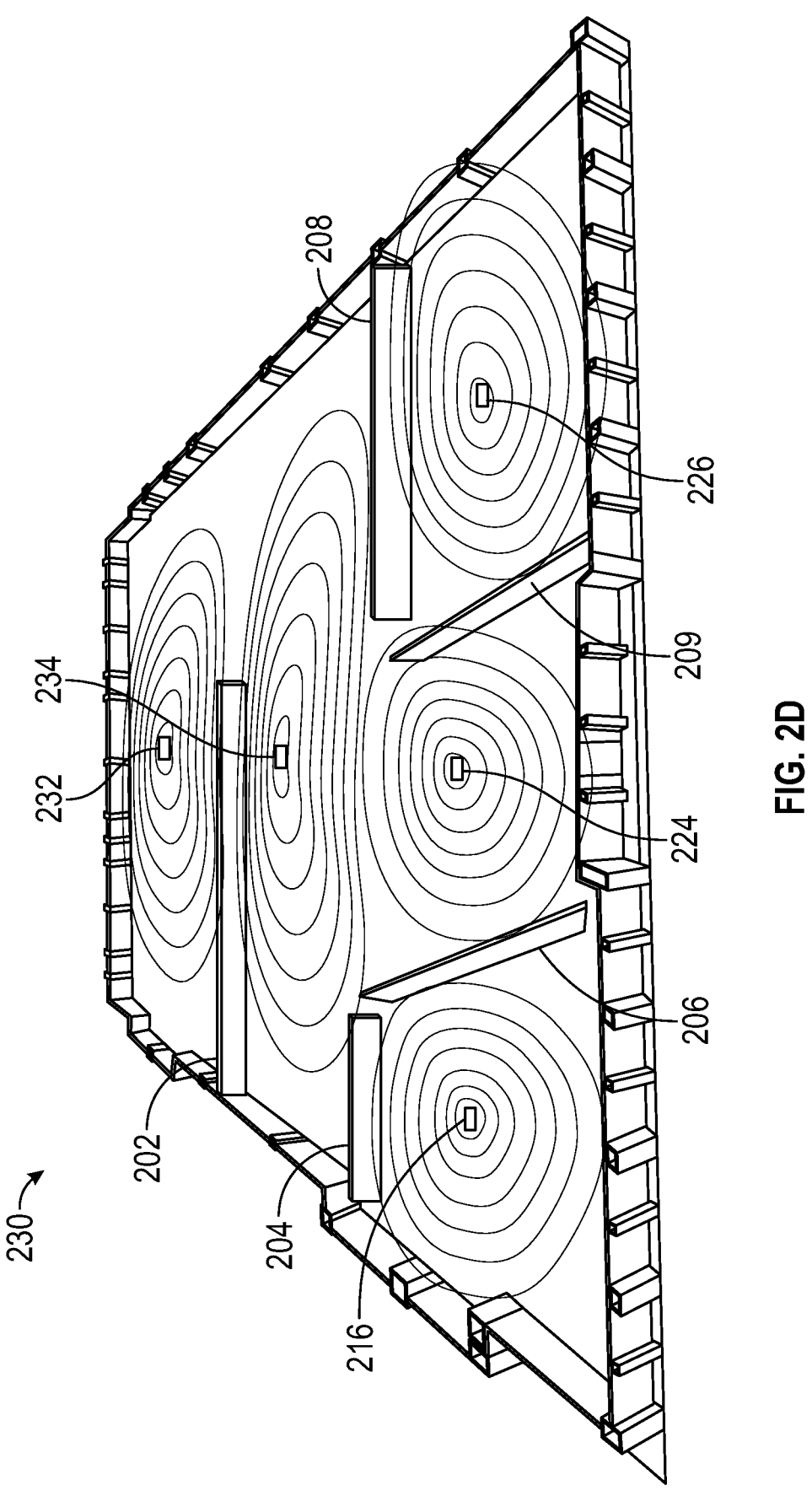
FIG. 2D is a diagram of a third wireless plan with low coverage and a high power saving score.

FIG. 2D is a diagram of a third wireless plan 230 with low coverage and a high power saving score. The third wireless plan 230 may include the sixth AP 216, the ninth AP 224, the tenth AP 226, an eleventh AP 232, and a twelfth AP 234. The planning system 114 may replace the first AP 211, the second AP 212, the third AP 213, the fourth AP 214, the fifth AP 215, and the eighth AP 222 with the eleventh AP 232, and the twelfth AP 234 to increase the power saving score of the third wireless plan 230 compared to the second wireless plan 220. The power saving score of the third wireless plan 230 may meet power saving requirements or some other metric the planning system 114 uses to determine if the power level is reduced (e.g., by comparing the power saving scores of wireless plans with acceptable coverage).

However, the planning system 114 may determine the third wireless plan 230 does not meet coverage requirements (e.g., the third wireless plan 230 does not have a high enough coverage score). The planning system 114 may determine the coverage score is not high enough because there is not full coverage (e.g., coverage interrupted near the first obstruction 202), because the APs may not be able to handle the amounts of clients and/or traffic, and/or the like. For example, the eleventh AP 232 and/or the twelfth AP 234 may provide coverage for the space but may not be able to service the amount of clients and/or traffic expected to occur in the space.

Figure 2E:
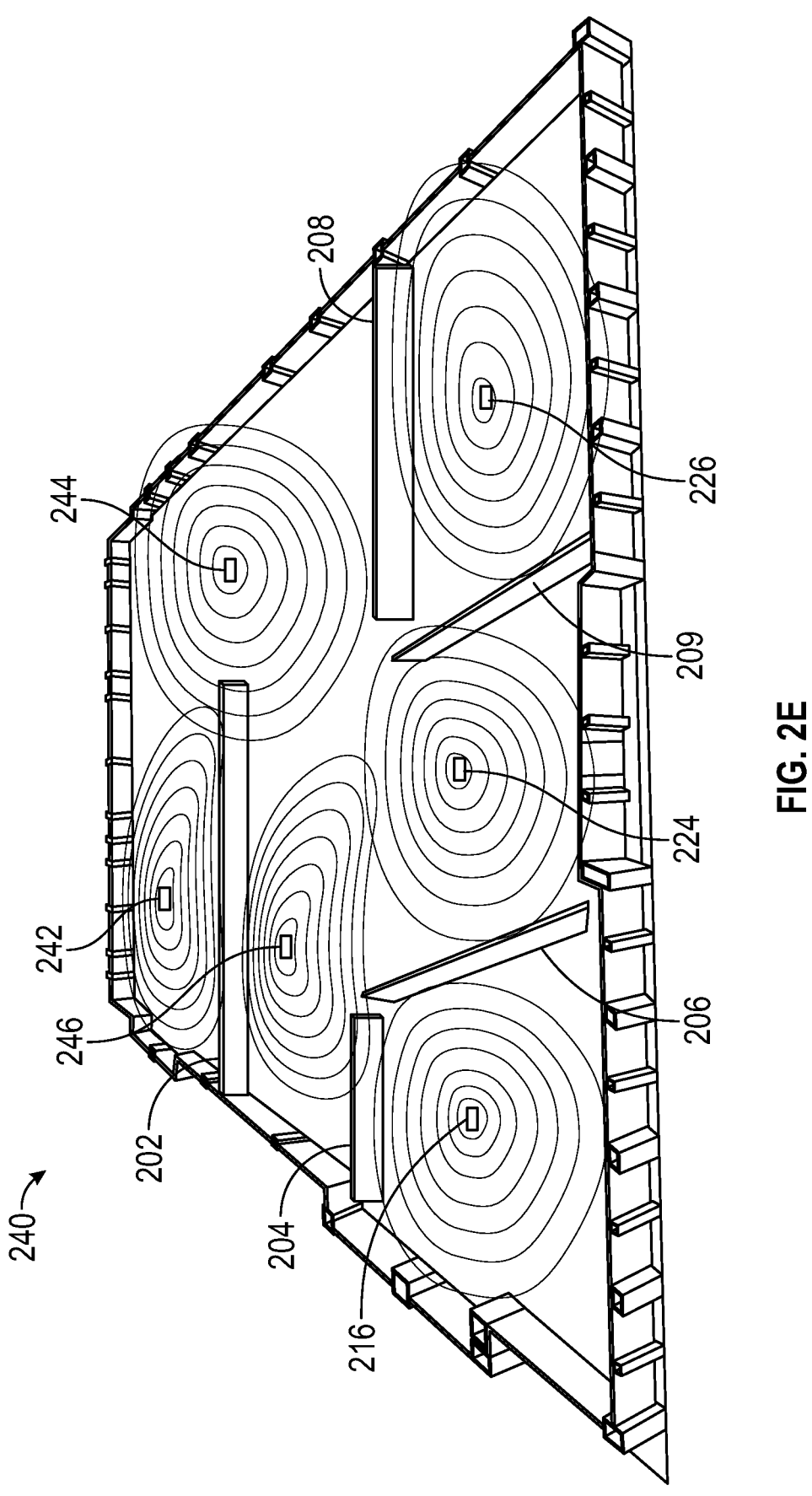
FIG. 2E is a diagram of a fourth wireless plan with high coverage and a high power saving score.

FIG. 2E is a diagram of a fourth wireless plan 240 with high coverage and a high power saving score. The fourth wireless plan 240 may include the sixth AP 216, the ninth AP 224, the tenth AP 226, a thirteenth AP 242, a fourteenth AP 244, and a fifteenth AP 246. The planning system 114 may replace the eleventh AP 232 and the twelfth AP 234 with the thirteenth AP 242, the fourteenth AP 244, and the fifteenth AP 246 to increase the coverage to meet requirements and keep the power saving score at an acceptable for implementation of the fourth wireless plan 240. The planning system 114 may determine the fourth wireless plan 240 has acceptable coverage and power saving scores and send the fourth wireless plan 240 to the client device 130 for review, adjustment, approval, and/or implementation.

The first wireless plan 210, the second wireless plan 220, the third wireless plan 230, and the fourth wireless plan 240 may be pending wireless plans until the planning system 114 determines the associated coverage score and power saving scores are sufficient to the pending wireless plan as a final wireless plan (e.g., selecting the fourth wireless plan 240 as a final wireless plan). The planning system 114 may only send final wireless plans for review, approval, adjustment, and/or implementation (e.g., by sending the final wireless plan to the client device 130), for example because the pending wireless plans do not meet one or more requirements. The first wireless plan 210, the second wireless plan 220, the third wireless plan, and the fourth wireless plan 240 may represent incremental changes to a single pending wireless plan or represent four separate wireless plans the planning system 114 evaluates.

Figure 3:
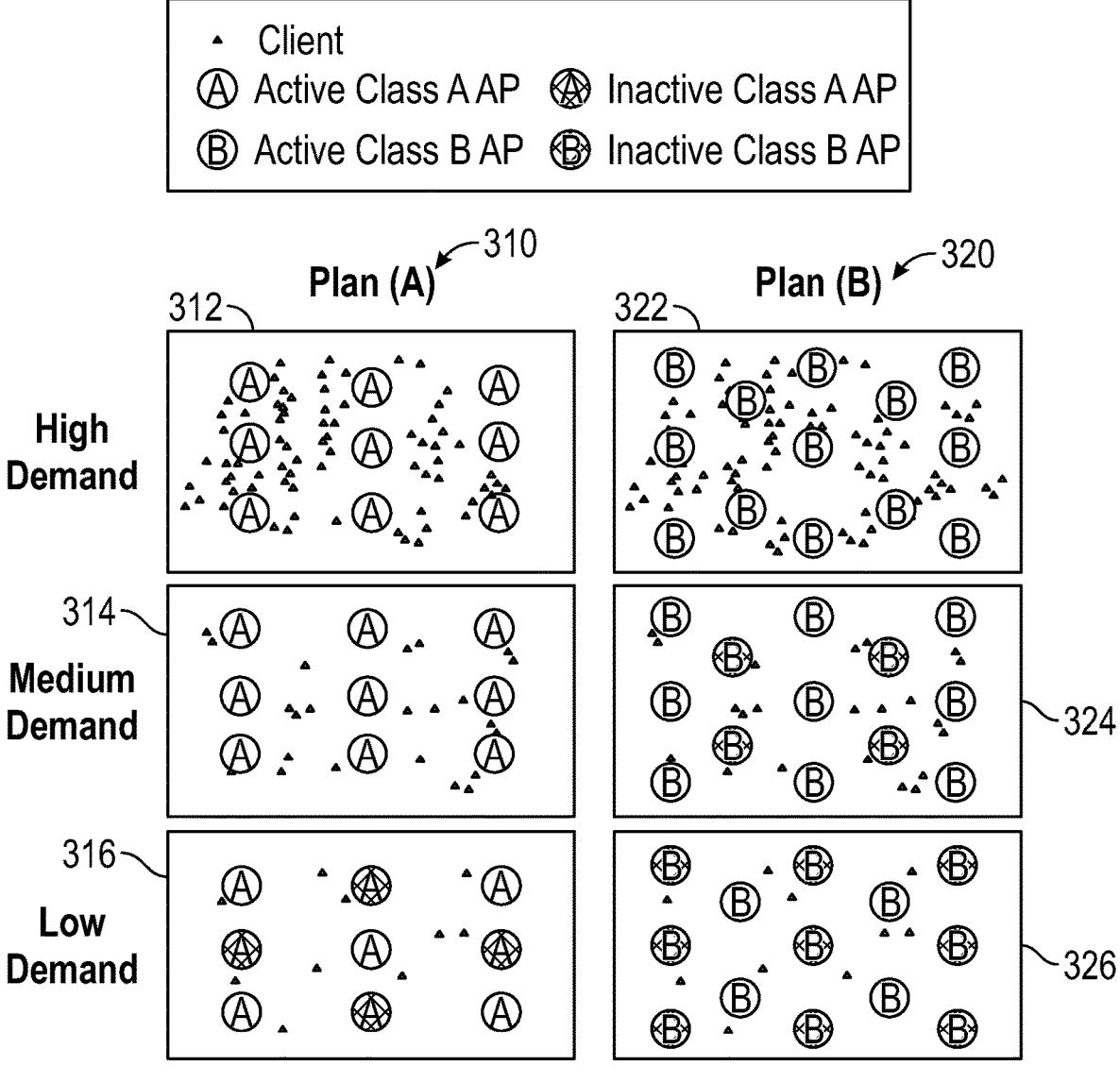
FIG. 3 is diagram of wireless plans for addressing wireless plan variables that change over time.

FIG. 3 is diagram of operating wireless plans 300 for addressing wireless plan variables that change over time. As described above, the planning system 114 may evaluate the coverage and power saving requirements at different times when demand may change (e.g., amount of clients, amount of traffic). The operating wireless plans 300 include a first variable wireless plan 310 and a second variable wireless plan 320. The first variable wireless plan 310 may include nine first class APs, and the second variable wireless plan 320 may include thirteen second class APs. The first class APs and second class APs may be different types of APs. The first class APs may consume more power than the second class APs, but the first class APs may serve more clients, handle more traffic, and/or provide more coverage than the second class APs.

The first variable wireless plan 310 may include operating all nine first class APs during periods of high demand as shown by the first wireless plan in high demand 312. The second variable wireless plan 320 may include operating all thirteen second class APs during periods of high demand as shown by the second wireless plan in high demand 322. The operation of nine first class APs may consume less power than the operation of thirteen second class APs. Therefore, the first variable wireless plan 310 may consume less energy during periods of high demand.

The first variable wireless plan 310 may include still operating all nine first class APs during periods of medium demand as shown by the first wireless plan in medium demand 314. For example, the coverage requirements may not be met if any of the first class APs are inactive. The second variable wireless plan 320 may include operating nine of the thirteen second class APs during periods of medium demand as shown by the second wireless plan in medium demand 324, for example because the coverage requirements are met with only nine second class APs. The operation of nine first class APs may consume more power than the operation of nine second class APs. Therefore, the second variable wireless plan 320 may consume less energy during periods of medium demand.

The first variable wireless plan 310 may include operating five of the nine first class APs during periods of low demand as shown by the first wireless plan in low demand 316. The second variable wireless plan 320 may include operating four of the thirteen second class APs during periods of low demand as shown by the second wireless plan in low demand 326. The operation of five first class APs may consume more power than the operation of four second class APs. Therefore, the second variable wireless plan 320 may consume less energy during periods of low demand.

Thus, the planning system 114 and/or by the client device 130 may select the first variable wireless plan 310 when high demand is expected for a long enough period that the power saving is increased through the implementation of the first variable wireless plan 310. Alternatively, the planning system 114 and/or by the client device 130 may select the second variable wireless plan 320 when medium demand and/or low demand is expected for a long enough period that the power saving is increased through the implementation of the second variable wireless plan 320.

Figure 4:
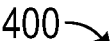
FIG. 4 is a block diagram of a method for wireless planning for reduced power consumption.

FIG. 4 is a block diagram of a method 400 for wireless planning for reduced power consumption. The method 400 may begin at starting block 405 and proceed to operation 410. In operation 410, characteristics of a space may be received. For example, the RF planner 110 may receive characteristics of the space, and the characteristic may include a representation of the space (e.g., a floor plan). The representation of the space may include information about the types of obstacles in the space (e.g., including the interference the obstacles will cause AP signals). The characteristics may also include one or more types of APs to be installed in the space, a minimum amount of APs to be installed, a maximum amount of APs to be installed, an amount of estimated clients to be present in the space, an amount of estimated traffic to occur in the space, and/or the like. The characteristics may additionally include information that details where clients are expected to be positioned in the space, amounts of clients expected to be in the space at different times, amounts of estimated traffic expected at different times, and/or the like.

In operation 420, a model of the space may be generated. For example, the modeling system 112 may generate the model of the space using the representation of the space received in operation 410. The modeling system 112 may generate the model of the space for the planning system 114 to use when generating wireless plans. For example, the model of the space may allow the planning system 114 to determine the size of the space, the obstacles in the space, the interference the obstacles will cause, and/or the like. Thus, the planning system 114 may input models of APs in the model of the space to model the operation of APs positioned in the space.

In operation 430, a coverage requirement and a power saving requirement for the space may be determined. For example, the planning system 114 may determine the coverage requirement and the power saving requirement. The coverage requirement may be included in the characteristics received in operation 410, be received from an external device (e.g., from the client device 130), be determined using an SLA, and/or the like. The planning system 114 may determine the power saving requirement using previous wireless plans, such as wireless plans for spaces of similar size, amounts of clients, amounts of traffic, and/or other characteristics. In some examples, the power saving requirement may be determined as wireless plans are generated and/or adjusted. For example, the planning system 114 may compare the power consumption of wireless plans that meet the coverage requirements, and the planning system 114 may determine that wireless plans that have the lowest power consumption or are below some threshold (e.g., lower power consumption than 75% of the other wireless plans that meet the threshold requirement). The planning system 114 may use a coverage score to indicate the coverage of a wireless plan, and the planning system 114 may use a power saving score to indicate the power savings of a wireless plan.

In operation 440, an initial wireless plan may be generated. For example, the planning system 114 may generate the initial wireless plan, and the initial wireless plan may include one or more APs positioned in the model of the space. The one or more APs may be models having AP types and/or AP operating conditions of APs that are candidates for installation in the space. The planning system 114 may generate the initial wireless plan by randomly placing the APs or by placing the APs in an estimated best position, based on the characteristics received in operation 410 for example. Additionally, the planning system 114 may generate multiple initial wireless plans in some examples, randomly and/or based on the characteristics for example. One or more of the multiple initial plans may have a higher level of coverage and/or power savings, so the planning system 114 may prefer some initial starting plans over others when adjusting the initial wireless plans to meet coverage and power saving requirements.

In operation 450, the initial wireless plan may be adjusted. The adjustment may include generating a new wireless plan based on the initial wireless plan or adjusting initial wireless plan without generating a new wireless plan. The planning system 114 may adjust the initial wireless plan based on the coverage requirement and the power saving requirement to generate a final wireless plan. For example, the planning system 114 may evaluate the initial wireless plan, assign the initial wireless plan a coverage score and a power saving score, and determine an adjustment to the initial wireless plan based on the coverage score and the power saving score (e.g., whether the coverage score and/or the power saving score meet a threshold value). The adjustment may also be based on the characteristics received in operation 410.

When multiple initial wireless plans are generated in operation 440, the planning system 114 may select one or more of the multiple wireless plans to adjust (e.g., selecting initial wireless plans with better coverage scores and/or power saving scores) The planning system 114 may evaluate the adjusted wireless plans individually and compared to other adjusted wireless plans to determine a final wireless plan. The planning system 114 may determine a single final wireless plan or multiple final wireless plans (e.g., a final wireless plan that emphasizes coverage requirement (i.e., the coverage score), a final wireless plan that balances the coverage requirement coverage score and the power saving requirement (i.e., the power saving score), a final wireless plan that emphasizes the power saving requirement) that meet coverage and power saving requirements. The method 400 may conclude at ending block 460.

Figure 5:
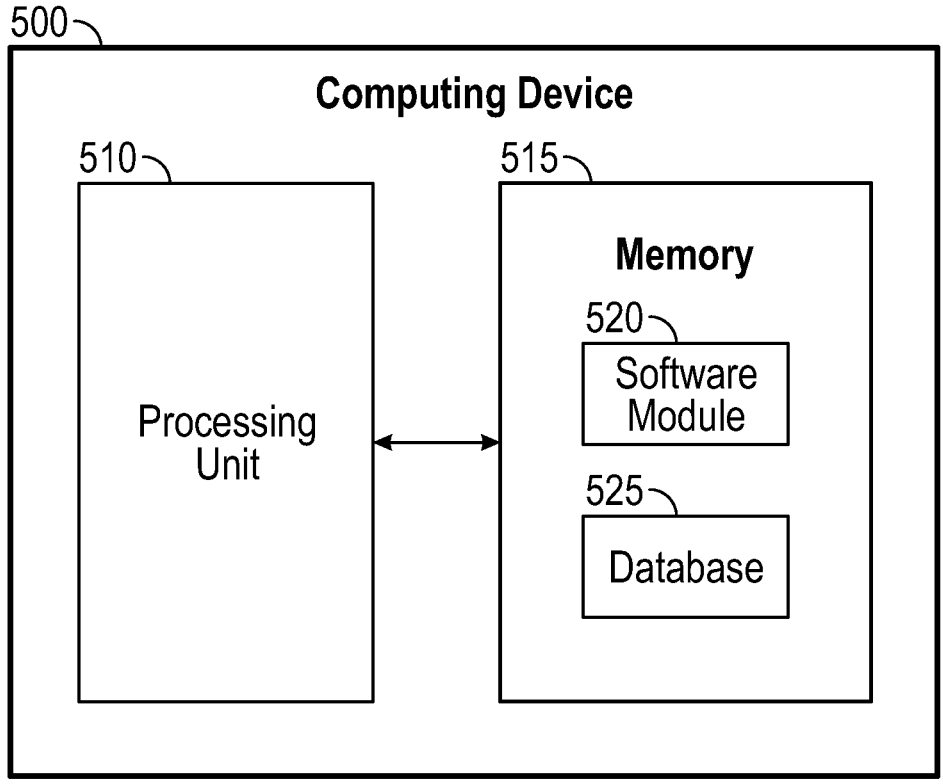
FIG. 5 is a block diagram of a computing device.

FIG. 5 is a block diagram of a computing device 500. As shown in FIG. 5, computing device 500 may include a processing unit 510 and a memory unit 515. Memory unit 515 may include a software module 520 and a database 525. While executing on processing unit 510, software module 520 may perform, for example, processes for wireless planning for reduced power consumption with respect to FIG. 1, FIG. 2A-2E, and FIG. 3. Computing device 500, for example, may provide an operating environment for the RF planner 110, the modeling system 112, the planning system 114, the display system 116, the client device 130, the first AP 211, the second AP 212, the third AP 213, the fourth AP 214, the fifth AP 215, the sixth AP 216, the seventh AP 217, the eighth AP 222, the ninth AP 224, the tenth AP 226, the eleventh AP 232, the twelfth AP 234, the thirteenth AP 242, the fourteenth AP 244, the fifteenth AP 246, and the like. The RF planner 110, the modeling system 112, the planning system 114, the display system 116, the client device 130, the first AP 211, the second AP 212, the third AP 213, the fourth AP 214, the fifth AP 215, the sixth AP 216, the seventh AP 217, the eighth AP 222, the ninth AP 224, the tenth AP 226, the eleventh AP 232, the twelfth AP 234, the thirteenth AP 242, the fourteenth AP 244, the fifteenth AP 246, and the like may operate in other environments and are not limited to computing device 500.

Computing device 500 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 500 may comprise any computer operating environment, such as hand-held devices, multiprocessor systems, microprocessor-based or programmable sender electronic devices, minicomputers, mainframe computers, and the like. Computing device 500 may also be practiced in distributed computing environments where tasks are performed by remote processing devices. The aforementioned systems and devices are examples, and computing device 500 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on, or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 500 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

The invention claimed is:

1. A method comprising:
  receiving, by a computing device, characteristics of a space, wherein the characteristics include a representation of at least one obstruction in the space that interferes with a signal;
  generating, by the computing device, a model of the space using the representation of the space;
  determining, by the computing device, a coverage requirement and a power saving requirement for the space;
  generating, by the computing device, an initial wireless plan including one or more Access Points (APs) APs positioned in the model of the space; and
  adjusting, by the computing device, the initial wireless plan based on the coverage requirement and the power saving requirement to generate a final wireless plan wherein adjusting the initial wireless plan based on the coverage requirement and the power saving requirement to generate the final wireless plan comprises generating any one of (i) a first final wireless plan that emphasizes a coverage score, (ii) a second final wireless plan that balances the coverage score and a power saving score, (iii) a third final wireless plan that emphasizes the power saving score, or (iv) any combination of (i)-(iii).

2. The method of claim 1, wherein the characteristics further comprise any one of (i) one or more types of APs, (ii) a minimum amount of APs, (iii) a maximum amount of APs, (iv) an amount of estimated clients, (v) an amount of estimated traffic, or (vi) any combination of (i)-(v).

3. The method of claim 2, wherein generating the initial wireless plan is based on the characteristics.

4. The method of claim 2, wherein adjusting the initial wireless plan is based on the characteristics.

5. The method of claim 1, further comprising:
  generating the coverage score based on the coverage of the one or more APs; and
  generating the power saving score based on a power consumption of the one or more APs.

6. The method of claim 5, wherein adjusting the initial wireless plan is based on the coverage score and the power saving score.

7. The method of claim 1, wherein adjusting the initial wireless plan is based on one or more variable wireless plan variables that change over time.

8. A system comprising:
  a memory storage; and
  a processing unit coupled to the memory storage, wherein the processing unit is operative to:
    receive characteristics of a space, wherein the characteristics include a representation of at least one obstruction in the space that interferes with a signal;
    generate a model of the space using the representation of the space;
    determine a coverage requirement and a power saving requirement for the space;
    generate an initial wireless plan including one or more Access Points (APs) positioned in the model of the space; and
    adjust the initial wireless plan based on the coverage requirement and the power saving requirement to generate a final wireless plan wherein the processing unit being operative to adjust the initial wireless plan based on the coverage requirement and the power saving requirement to generate the final wireless plan comprises the processing unit being operative to generate any one of (i) a first final wireless plan that emphasizes a coverage score, (ii) a second final wireless plan that balances the coverage score and a power saving score, (iii) a third final wireless plan that emphasizes the power saving score, or (iv) any combination of (i)-(iii).

9. The system of claim 8, wherein the characteristics further comprise any one of (i) one or more types of APs, (ii) a minimum amount of APs, (iii) a maximum amount of APs, (iv) an amount of estimated clients, (v) an amount of estimated traffic, or (vi) any combination of (i)-(v).

10. The system of claim 9, wherein to generate the initial wireless plan is based on the characteristics.

11. The system of claim 9, wherein to adjust the initial wireless plan is based on the characteristics.

12. The system of claim 8, the processing unit being further operative to:

generate the coverage score based on the coverage of the one or more APs; and generate the power saving score based on a power consumption of the one or more APs.

13. The system of claim 12, wherein to adjust the initial wireless plan is based on the coverage score and the power saving score.

14. A non-transitory computer-readable medium that stores a set of instructions which when executed perform a method executed by the set of instructions comprising:

receiving characteristics of a space, wherein the characteristics include a representation of at least one obstruction in the space that interferes with a signal;

generating a model of the space using the representation of the space;

determining a coverage requirement and a power saving requirement for the space;

generating an initial wireless plan including one or more Access Points (APs) positioned in the model of the space; and adjusting the initial wireless plan based on the coverage requirement and the power saving requirement to generate a final wireless plan wherein adjusting the initial wireless plan based on the coverage requirement and the power saving requirement to generate the final wireless plan comprises generating any one of (i) a first final wireless plan that emphasizes a coverage score, (ii) a second final wireless plan that balances the coverage score and a power saving score, (iii) a third final wireless plan that emphasizes the power saving score, or (iv) any combination of (i)-(iii).

15. The non-transitory computer-readable medium of claim 14, wherein the characteristics further comprise any one of (i) one or more types of APs, (ii) a minimum amount of APs, (iii) a maximum amount of APs, (iv) an amount of estimated clients, (v) an amount of estimated traffic, or (vi) any combination of (i)-(v).

16. The non-transitory computer-readable medium of claim 15, wherein generating the initial wireless plan is based on the characteristics.

17. The non-transitory computer-readable medium of claim 15, wherein adjusting the initial wireless plan is based on the characteristics.

18. The non-transitory computer-readable medium of claim 15, the method executed by the set of instructions further comprising:

generating the coverage score based on the coverage of the one or more APs; and generating the power saving score based on a power consumption of the one or more APs.

19. The non-transitory computer-readable medium of claim 18, wherein adjusting the initial wireless plan is based on the coverage score and the power saving score.

* * * * *